United States Patent
Pedersen et al.

(10) Patent No.: US 7,817,719 B2
(45) Date of Patent: Oct. 19, 2010

(54) SYSTEM FOR INCREASING THE SPEED OF A SUM-OF-ABSOLUTE-DIFFERENCES OPERATION

(75) Inventors: Ronny Pedersen, Trondheim (NO);
Erik K. Renno, Trondheim (NO);
Oyvind Strom, Trondheim (NO)

(73) Assignee: Atmel Corporation, San Jose, CA (US)

( * ) Notice: Subject to any disclaimer, the term of this patent is extended or adjusted under 35 U.S.C. 154(b) by 1541 days.

(21) Appl. No.: 11/140,749

(22) Filed: May 31, 2005

(65) Prior Publication Data
US 2006/0285593 A1    Dec. 21, 2006

(51) Int. Cl.
*H04N 7/12* (2006.01)
*G06K 9/36* (2006.01)

(52) U.S. Cl. .................... 375/240.16; 382/236
(58) Field of Classification Search ............ 375/240.16; 382/232, 236; 708/230, 490; 712/42
See application file for complete search history.

(56) References Cited

U.S. PATENT DOCUMENTS

| | | | | | |
|---|---|---|---|---|---|
| 4,422,143 | A | * | 12/1983 | Guttag ........................ | 712/42 |
| 4,648,059 | A | | 3/1987 | Gregorcyk .................. | 364/769 |
| 4,761,759 | A | | 8/1988 | Nakagawa .................. | 364/769 |
| 4,814,976 | A | | 3/1989 | Hansen et al. .............. | 711/201 |
| 4,849,921 | A | | 7/1989 | Yasumoto et al. ......... | 364/715.01 |
| 4,953,115 | A | | 8/1990 | Kanoh ........................ | 364/715.01 |
| 5,148,386 | A | | 9/1992 | Hori ............................ | 364/768 |
| 5,305,249 | A | | 4/1994 | Yoshida ...................... | 364/768 |
| 5,379,351 | A | * | 1/1995 | Fandrianto et al. ......... | 382/236 |
| 5,485,411 | A | * | 1/1996 | Guttag et al. ............... | 708/230 |
| 5,563,813 | A | | 10/1996 | Chen et al. ................. | 364/715.01 |
| 5,610,850 | A | | 3/1997 | Uratani et al. ............. | 364/769 |
| 5,793,655 | A | | 8/1998 | Harlap et al. ............... | 364/715.012 |
| 5,835,389 | A | | 11/1998 | Wong .......................... | 364/715.012 |
| 5,944,771 | A | | 8/1999 | Shiraishi ..................... | 708/201 |
| 5,957,996 | A | | 9/1999 | Shiraishi ..................... | 708/201 |

(Continued)

FOREIGN PATENT DOCUMENTS

| | | |
|---|---|---|
| WO | WO-2006013023 A2 | 12/2006 |
| WO | WO-2006130323 A3 | 12/2006 |

OTHER PUBLICATIONS

"Application Serial No. PCT/US2006/018310, International Search Report mailed Jul. 26, 2007", 1 pg.

*Primary Examiner*—Gims S Philippe
(74) *Attorney, Agent, or Firm*—Schwegman, Lundberg & Woessner, P.A.

(57) ABSTRACT

An adaptation of the sum-of-absolute-differences (SAD) calculation is implemented by modifying existing circuitry in a microprocessor. The adaptation yields a reduction of over 30% for a current SAD calculation. The adaptation includes a first and second operand register, each storing respectively a first and second set of 2's complement binary data, an arithmetic logic unit (ALU), and a destination register. An add/subtract enable input on the ALU receives a most significant bit (MSB) of the second set of binary data. The ALU adds the first and second data sets if the MSB is a "0" and subtracts the second data set from the first data set if the MSB is a "1." The add/subtract enable input has the effect of taking the absolute value of the second data set without having to first perform an absolute value determination, thus eliminating processing steps.

17 Claims, 1 Drawing Sheet

U.S. PATENT DOCUMENTS

| | | |
|---|---|---|
| 6,219,688 B1 | 4/2001 | Guttag et al. |
| 6,421,698 B1 * | 7/2002 | Hong .......................... 708/490 |
| 6,473,529 B1 | 10/2002 | Lin ............................ 382/236 |
| 6,556,716 B2 * | 4/2003 | Hong .......................... 382/232 |
| 2001/0046264 A1 | 11/2001 | Fandrianto et al. |
| 2005/0027969 A1 | 2/2005 | Simon et al. ................ 712/225 |

\* cited by examiner

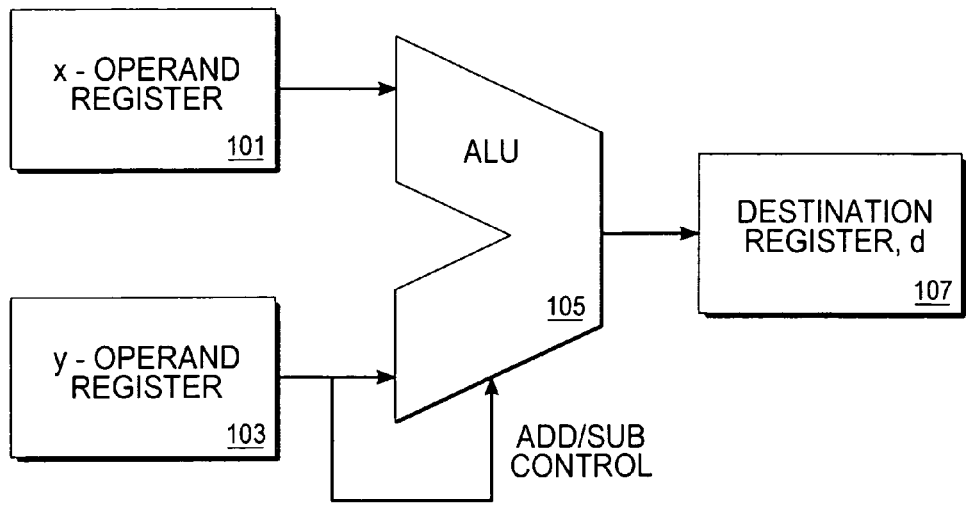
Fig._1
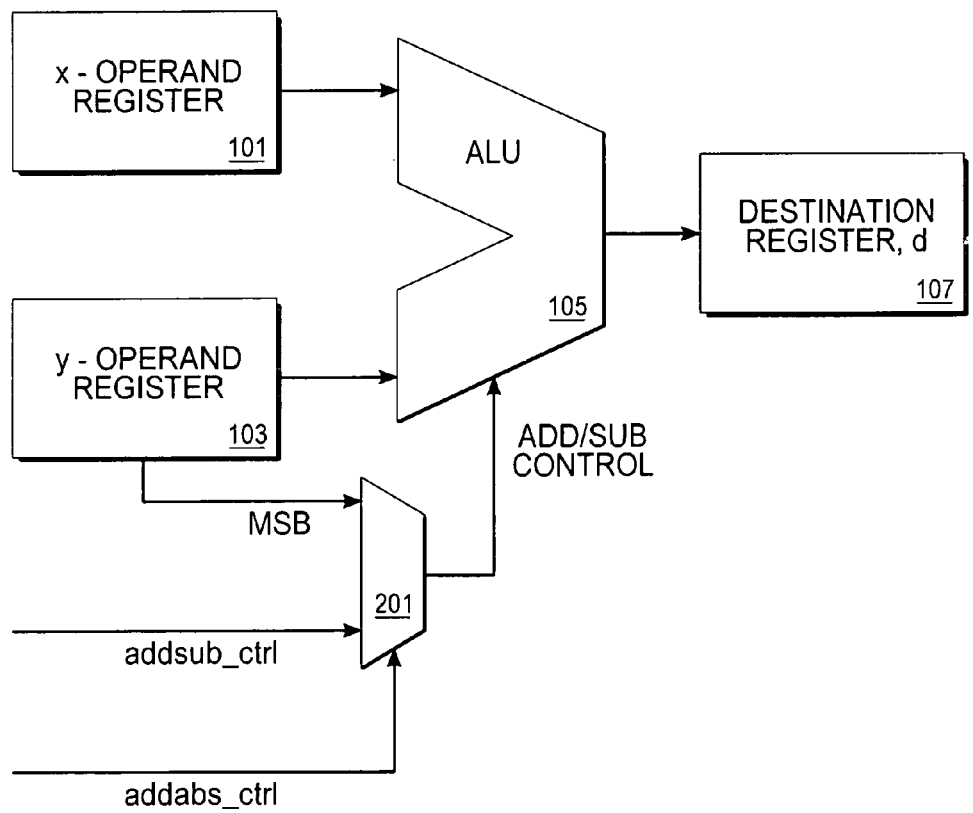
Fig._2

SYSTEM FOR INCREASING THE SPEED OF A SUM-OF-ABSOLUTE-DIFFERENCES OPERATION

TECHNICAL FIELD

The present invention relates to arithmetic operations in microprocessors, both load-store architectures (i.e., RISC machines) and memory-oriented architectures (i.e., CISC machines). Specifically, the present invention relates to arithmetic operations used in motion-estimation algorithms and other applications using a sum-of-differences (SAD) operation.

BACKGROUND ART

Video images have become an increasingly important part of communications in general. An ability to nearly instantaneously transmit still images, and particularly, live moving images, has greatly enhanced global communications.

In particular, videoconferencing systems have become an increasingly important business communication tool. These systems facilitate meetings between persons or groups of persons situated remotely from each other, thus eliminating or substantially reducing the need for expensive and time-consuming business travel. Since videoconference participants are able to see facial expressions and gestures of remote participants, richer and more natural communication is engendered. In addition, videoconferencing allows sharing of visual information, such as photographs, charts, and figures, and may be integrated with personal computer applications to produce sophisticated multimedia presentations.

To provide cost-effective video communication, bandwidth required to convey video must be limited. A typical bandwidth used for videoconferencing lies in the range of 128 to 1920 kilobits per second (Kbps). Problems associated with available videoconferencing systems in an attempt to cope with bandwidth limitations include slow frame rates resulting in a non-lifelike picture having an erratic, jerky motion, the use of small video frames or limited spatial resolution of a transmitted video frame, and a reduction in the signal-to-noise ratio of individual video frames. Conventionally, if one or more of these effects is undesirable, then higher bandwidths are required.

At 768 Kbps, digital videoconferencing, using state-of-the-art video encoding methods, produces a picture that may be likened to a scene from analog television. Typically, for most viewers, twenty-four frames per second (fps) are required to make video frames look fluid and give the impression that motion is continuous. As the frame rate is reduced below twenty-four fps, an erratic motion results. In addition, there is always a tradeoff between a video frame size required and available network capacity. Therefore, lower bandwidth requires a lower frame rate and/or reduced video frame size.

A standard video format used in videoconferencing, defined by resolution, is Common Intermediate Format (CIF). The primary CIF format is also known as Full CIF or FCIF. The International Telecommunications Union (ITU), based in Geneva, Switzerland (www.itu.ch), has established this communications standard. Additional standards with resolutions higher and lower than CIF have also been established. Resolution and bit rate requirements for various formats are shown in Table 1. Bit rates (in megabits per second, Mbps) shown are for uncompressed color frames where 12 bits per pixel is assumed.

Video compression is a way of encoding digital video to take up less storage space and reduce required transmission bandwidth. Certain compression/decompression (CODEC) schemes are frequently used to compress video frames to reduce the required transmission bit rates. Overall, CODEC hardware or software compresses digital video into a smaller binary format than required by the original (i.e., uncompressed) digital video format. As can be noted from Table 1, there is an extraordinarily large number of bits (e.g., nearly 584 million bits each second in a 16CIF format), and consequently, a tremendous amount of processing of the bits that must occur for effective video processing and motion estimation. Consequently, an ever-increasing application for microprocessors is CODEC processing.

TABLE 1

Resolution and bit-rates for various CIF formats

| CIF Format | Resolution (in pixels) | Bit Rate at 30 fps (Mbps) |
| --- | --- | --- |
| SQCIF (Sub Quarter CIF) | 128 × 96 | 4.4 |
| QCIF (Quarter CIF) | 176 × 144 | 9.1 |
| CIF (Full CIF, FCIF) | 352 × 288 | 36.5 |
| 4CIF (4 × CIF) | 704 × 576 | 146.0 |
| 16CIF (16 × CIF) | 1408 × 1152 | 583.9 |

Motion estimation algorithms are a significant part of the CODEC processing. A sum-of-absolute-differences (SAD) operation is frequently the cornerstone of most motion estimation algorithms. Based on the amount of processing required for every frame in a video image, the SAD operation is extremely computationally intensive. Therefore, the operation must be performed as quickly and efficiently as possible.

A governing equation of the SAD operation:

$$SAD(U, V) = \sum_{x=0}^{15} \sum_{y=0}^{15} |U(x, y) - V(x, y)|$$

where U and V are image frames and x and y are 2-dimensional spatial coordinates. Despite its apparent innocuous and simple form, the SAD governing equation in its current formulation, when coupled with the tremendously high number of bits requiring processing, is extremely computationally intensive and thus places a limit on a temporal speed of motion estimation algorithms. Adding additional hardware (e.g., multiple processors, additional memory, additional registers) increases a speed of the computation but at a sacrifice of geometrical space considerations and cost-to-implement.

Therefore, although the SAD operation and other compression methods have proven somewhat effective, there remains a need to improve video quality over low bandwidth transmission channels while not significantly increasing space for hardware performing the calculations or a cost of the implementing hardware.

SUMMARY

The present invention implements an adaptation of the SAD governing equation in microprocessors by modifying hardware already present in all microprocessors. The adaptation yields a reduction of over 30% for a current SAD calculation by reducing required calculations in a normally time-intensive inner iteration loop.

In one exemplary embodiment, the present invention is a system for calculating sum-of-absolute-differences which includes a first and second operand register, each storing respectively a first and second set of binary data as 2's complement, an arithmetic logic unit, and a destination register.

The arithmetic logic unit has an add/subtract enable input to receive a most significant bit (MSB) of the second set of binary data. The MSB represents a sign of the second set of binary data. The arithmetic logic unit receives the first and second sets of binary data and adds the data sets if the MSB is a "0" and subtracts the second data set from the first data set if the MSB is a "1." The add/subtract enable input has the effect of taking the absolute value of the second data set without having to first perform an absolute value determination, thus eliminating processing steps.

BRIEF DESCRIPTION OF THE DRAWINGS

FIG. 1 shows an exemplary embodiment of the present invention implemented in a microprocessor with an arithmetic logic unit and operand and destination registers.

FIG. 2 shows a specific exemplary embodiment of the present invention implemented in a microprocessor with an arithmetic logic unit and operand and destination registers.

DETAILED DESCRIPTION

An embodiment of the present invention implements an adaptation of the SAD governing equation by modifying hardware already present in all microprocessors. The governing equation of the SAD operation $$SAD(U, V) = \sum_{x=0}^{15} \sum_{y=0}^{15} |U(x, y) - V(x, y)|$$

is conventionally implemented (in pseudocode) as $$\begin{aligned} &\text{for } x = 0 \text{ to } x = 15 \\ &\quad \text{for } y = 0 \text{ to } y = 15 \\ &\quad\quad \text{temp} = U(x, y) - V(x, y) \\ &\quad\quad \text{temp} = \text{abs}(\text{temp}) \\ &\quad\quad SAD = SAD + \text{temp} \end{aligned} \quad (1)$$

To increase computational speed, SAD operations can be implemented directly as a result of an operation of summing data registers; thus, SAD(U,V) may be implemented as $$\text{Result} = \text{Operand } x + |\text{Operand } y| \quad (2)$$

The operation defined by equation (2) and referred to as "Add Absolute Value" (ADDABS), will, when implemented by a suitable instruction, increase the SAD calculation speed compared with the conventional implementation of operation (1), supra. Equation (2) can be rewritten as $$\begin{aligned} &\text{if (Operand } y) < 0 \\ &\quad \text{Result} \quad = \text{Operand } x + (-\text{Operand } y) \\ &\quad\quad\quad\quad = \text{Operand } x - \text{Operand } y \\ &\text{else} \\ &\quad \text{Result} = \text{Operand } x + \text{Operand } y \end{aligned} \quad (3)$$

For 2's complements numbers, the sign of a binary number is given by the most significant bit (MSB) of the number. Thus, the "if" statement of the pseudocode of operation of (3) can be written as $$\text{if (Operand } y[\text{MSB}]) == 1 \quad (4)$$

Implementing the "if" statement (4) into operation (1) and applying the ADDABS operation (2) yields $$\begin{aligned} &\text{for } x = 0 \text{ to } x = 15 \\ &\quad \text{for } y = 0 \text{ to } y = 15 \\ &\quad\quad \text{temp} = U(x, y) - V(x, y) \\ &\quad\quad \text{ADDABS SAD, SAD, temp} \end{aligned} \quad (5)$$

This substitution yields a reduction from three operations currently used (operation (1)) down to two operations (operation (5)) in the normally time-intensive inner iteration loop.

FIG. 1 implements a portion of the operation (5) in hardware and includes an x-operand register 101, a y-operand register 103, an arithmetic logic unit (ALU) 105, and a destination register, d, 107. An input to the ALU 105, "Add/Sub Control," provides a determination whether an addition or subtraction operation should be performed. A "1" input (i.e., the MSB indicates that the unary operator in 2's complement is negative) enables a subtraction operation. Conversely, a "0" input (i.e., the MSB indicates that the unary operator in 2's complement is positive) enables an addition operation. Therefore, if the MSB of operand y is "1," a resulting operation in the ALU 105 is x-y. If the MSB of operand y is "0," a resulting operation in the ALU 105 is x+y.

In a specific exemplary embodiment, the ADDABS operation adds a location of the x-operand register 101 to a location of the y-operand register 103 and stores the result on the destination register 107. Thus, the operation is reduced to $$Rd \leftarrow Rx + |Ry| \quad (6)$$

where Rx is the contents of the x-operand register 101, Ry is the contents of the y-operand register 103, and Rd are the data stored in the destination register 107. For a 16-bit word, operands for each register in equation (6) are $\{x,y,d\} \in \{0, 1, \ldots, 15\}$. In this specific exemplary embodiment, syntax of operations for equation (6) is ADDABS Rd, Rx, Ry.

In a specific exemplary embodiment of FIG. 2, a multiplexer 201 is added to the general circuit configuration in accordance with FIG. 1. An input "addabs_ctrl" determines whether an ADDABS operation or a standard add/subtract operation should be performed. A "1" input will force a standard add or subtract operation, while a "0" input forces an ADDABS operation.

An input to the multiplexer 201, "addsub_ctrl," determines whether an addition or subtraction should be performed. This input becomes valid if "addsub_ctrl" is set to "1." Providing a "1" input to "addsub_ctrl" forces a subtraction operation, while a "0" forces an addition operation.

For example, if "addabs_ctrl" is set to "0," the MSB of operand y determines whether an addition or subtraction is performed. If the MSB of operand y is "1," x-y is performed. If the MSB of operand y is "0," x+y is performed.

Although the exemplary embodiments are described in terms of a video CODEC system, a skilled artisan will recognize the value of increasing a calculation speed of SAD operations in other areas as well. For example, calculation of spatial statistics frequently employ sum-of-absolute-difference calculations; specifically, autocorrelation functions and power spectral density functions (e.g., as employed in communication theory) can benefit from the increased computational speed of the present invention described herein.

Further, one skilled in the art will recognize that other hardware implementations may readily be employed as well. For example, other hardware implementations could include ripple-carry adders or carry-lookahead adders in place of the arithmetic logic unit. Such combinatorial circuits are well known in the art and may be readily combined to accomplish the SAD operations described herein. Additionally, a skilled artisan will recognize that the present invention will work readily with other word sizes, such as, for example, 32-bit words. Therefore, the specification and drawings are to be regarded in an illustrative rather than a restrictive sense.

What is claimed is:

1. A video conferencing motion estimation system, the system comprising:
   a microprocessor, the microprocessor being configured to operate as a compression and decompression (CODEC) device, the CODEC device including;
   a first operand register, the first operand register configured to store a first set of binary data as 2's complement;
   a second operand register, the second operand register configured to store a second set of binary data as 2's complement;
   an arithmetic logic unit, the arithmetic logic unit having a first input and a second input, the first input coupled to receive the first set of binary data and the second input coupled to receive the second set of binary data, the arithmetic logic unit further having an add/subtract enable input, the add/subtract enable input coupled to receive a most significant bit of the second set of binary data, the most significant bit representing a sign of the second set of binary data, the arithmetic logic unit being configured to add data input from the first and second operand registers if the most significant bit is of a first value and subtract the second set of binary data from the first set of binary data if the most significant bit is of a second value;
   a destination register, the destination register coupled to an output of the arithmetic logic unit to receive a result; and
   a multiplexer, the multiplexer having a first input and a second input, an output, and a select terminal, the output being coupled to the add/subtract enable input of the arithmetic logic unit, the first input being coupled to receive the most significant bit of the second set of binary data, and the second input being coupled to an add/subtract control line.

2. The system of claim 1 wherein the first value is a binary "0" and the second value is a binary "1."

3. The system of claim 1 wherein a first select value applied to the select terminal enables the arithmetic logic unit to be able to perform an addition or subtraction operation and a second select value applied to the select terminal enables the arithmetic logic unit to perform an addabs operation, the addabs operation being defined as adding an absolute value of the second set of binary data to the first set of binary data.

4. The system of claim 1 wherein a first value on the add/subtract control line enables the arithmetic logic unit to perform an addition operation and a second value on the add/subtract control line enables the arithmetic logic unit to perform a subtraction operation.

5. A system for calculating sum-of-absolute-differences, the system comprising:
   a first operand register, the first operand register configured to store a first set of binary data as 2's complement;
   a second operand register, the second operand register configured to store a second set of binary data as 2's complement;
   an arithmetic logic unit, the arithmetic logic unit having a first input and a second input, the first input coupled to receive the first set of binary data and the second input coupled to receive the second set of binary data, the arithmetic logic unit further having an add/subtract enable input, the add/subtract enable input coupled to receive a bit of the second set of binary data, the bit representing a sign of the second set of binary data, the arithmetic logic unit being configured to add data input from the first and second operand registers if the bit is of a first value and subtract the second set of binary data from the first set of binary data if the most significant bit is of a second value;
   a destination register, the destination register coupled to an output of the arithmetic logic unit to receive a result; and
   a multiplexer, the multiplexer having a first input and a second input, an output, and a select terminal, the output being coupled to the add/subtract enable input of the arithmetic logic unit, the first input being coupled to receive the bit of the second set of binary data, and the second input being coupled to an add/subtract control line.

6. The system of claim 5 wherein the first value is a binary "0" and the second value is a binary "1."

7. The system of claim 5 wherein a first select value applied to the select terminal enables the arithmetic logic unit to be able to perform an addition or subtraction operation and a second select value applied to the select terminal enables the arithmetic logic unit to perform an addabs operation, the addabs operation being defined as adding an absolute value of the second set of binary data to the first set of binary data.

8. The system of claim 5 wherein a first value on the add/subtract control line enables the arithmetic logic unit to perform an addition operation and a second value on the add/subtract control line enables the arithmetic logic unit to perform a subtraction operation.

9. A system for calculating sum-of-absolute-differences, the system comprising:
   a first operand register, the first operand register configured to store a first set of binary data as 2's complement;
   a second operand register, the second operand register configured to store a second set of binary data as 2's complement;
   an arithmetic logic unit, the arithmetic logic unit having a first input and a second input, the first input coupled to receive the first set of binary data and the second input coupled to receive the second set of binary data, the arithmetic logic unit further having an add/subtract enable input, the add/subtract enable input coupled to receive a most significant bit of the second set of binary data, the most significant bit representing a sign of the second set of binary data, the arithmetic logic unit being configured to add data input from the first and second operand registers if the most significant bit is of a first value and subtract the second set of binary data from the first set of binary data if the most significant bit is of a second value;
   a destination register, the destination register coupled to an output of the arithmetic logic unit to receive a result; and
   a multiplexer, the multiplexer having a first input and a second input, an output, and a select terminal, the output being coupled to the add/subtract enable input, the first input being coupled to receive the most significant bit of the second set of binary data, the second input being coupled to an add/subtract control line.

10. The system of claim 9 wherein a first select value applied to the select terminal enables the arithmetic logic unit to be able to perform an addition or subtraction operation and a second select value applied to the select terminal enables the arithmetic logic unit to perform an addabs operation, the addabs operation being defined as adding an absolute value of the second set of binary data to the first set of binary data.

11. The system of claim 9 wherein a first value on the add/subtract control line enables the arithmetic logic unit to perform an addition operation and a second value on the add/subtract control line enables the arithmetic logic unit to perform a subtraction operation.

12. A system for calculating sum-of-absolute-differences, the system comprising:
- a first operand register, the first operand register configured to store a first set of binary data as 2's complement;
- a second operand register, the second operand register configured to store a second set of binary data as 2's complement;
- an arithmetic calculation means for accepting a most significant bit of the second data set and adding the first and second binary data sets directly if the most significant bit is a first value and subtracting the second set of binary data from the first set of binary data if the most significant bit is of a second value;
- a destination register, the destination register coupled to an output of the arithmetic logic unit to receive a result; and
- a multiplexer, the multiplexer having a first input and a second input, an output, and a select terminal, the output being coupled to arithmetic calculation means, the first input being coupled to receive the most significant bit of the second set of binary data, the second input being coupled to an add/subtract control line.

13. The system of claim 12 wherein a first select value applied to the select terminal enables the arithmetic calculation means to be able to perform an addition or subtraction operation and a second select value applied to the select terminal enables the arithmetic calculation means to perform an addabs operation, the addabs operation being defined as adding an absolute value of the second set of binary data to the first set of binary data.

14. The system of claim 12 wherein a first value on the add/subtract control line enables the arithmetic calculation means to perform an addition operation and a second value on the add/subtract control line enables the arithmetic calculation means to perform a subtraction operation.

15. The system of claim 12, wherein the arithmetic calculation means is an arithmetic logic unit.

16. The system of claim 12, wherein the arithmetic calculation means is a ripple-carry adder.

17. The system of claim 12, wherein the arithmetic calculation means is a carry lookahead adder.

* * * * *